No. 825,648. PATENTED JULY 10, 1906.
J. F. HAWORTH.
CALIPERS.
APPLICATION FILED JUNE 28, 1905.

WITNESSES. INVENTOR.

UNITED STATES PATENT OFFICE.

JEHU FREDERICK HAWORTH, OF SHIELDS, PENNSYLVANIA.

CALIPERS.

No. 825,648.

Specification of Letters Patent.

Patented July 10, 1906.

Application filed June 28, 1905. Serial No. 267,438.

*To all whom it may concern:*

Be it known that I, JEHU FREDERICK HAWORTH, a resident of Shields, in the county of Allegheny and State of Pennsylvania, have invented a new and useful Improvement in Calipers; and I do hereby declare the following to be a full, clear, and exact description thereof.

My invention relates to a calipers, and more especially to a form of calipers particularly adapted for the measuring of the thickness of the top and bottom boards of violins, although, of course, my invention may be applied to other uses, and I do not wish to limit myself in any way to any specific use.

The object of my invention is to provide a calipers by means or which the thickness of the walls of hollow bodies may be readily and accurately calculated and which may be conveniently inserted or withdrawn from said hollow bodies.

To these ends my invention comprises, generally stated, calipers comprising a frame with outwardly-projecting arms, a movable leg on one side of said arms adapted to register with the other arm, said leg having an outwardly-projecting portion adapted to register with a point on the arm which carries said leg.

To enable others skilled in the art to make and use my invention, I will describe the same more fully, referring to the accompanying drawings, in which—

Figure 1:
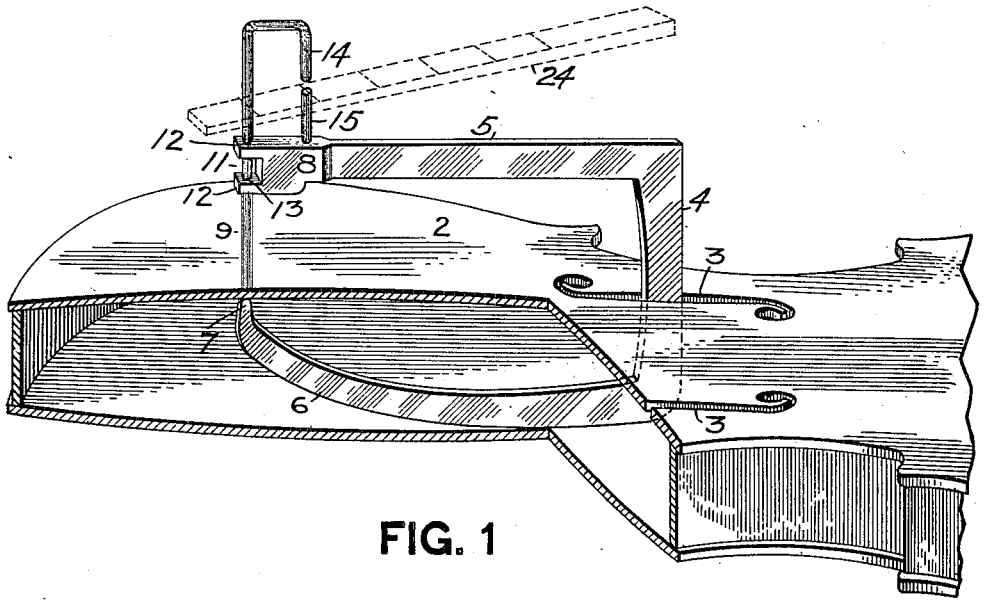
Figure 2:
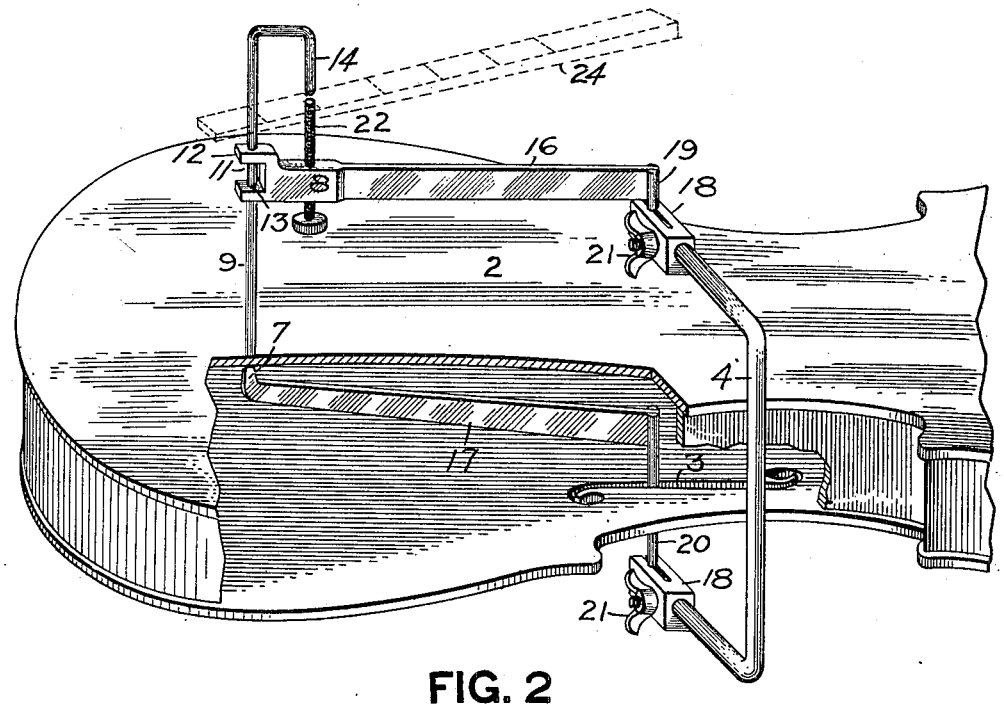

Figure 1 is a view of a violin broken away, showing my improved calipers applied thereto in the measuring of the thickness of the top board of the violin. Fig. 2 is a like view showing a different form of calipers for measuring the thickness of the bottom board of the violin.

Like numerals indicate like parts.

In the accompanying drawings numeral 2 discloses a portion of a violin provided with the customary F holes 3.

The calipers which form the subject-matter of the invention comprises the frame 4, which may be formed of suitable metal, having outwardly-projecting arms 5 and 6. The arm 6 may be slightly curved, as indicated, and is provided at its outer end with an upwardly-projecting stud 7. The arm 5 is provided at its outer end with an enlargement 8, forming a guide or seat for the leg 9. The enlargement is recessed, as at 11, and the projecting lugs 12 have openings 13, formed therein, through which the leg 9 passes. The leg is adapted to slide or move freely in the openings 13, so as to be capable of vertical as well as rotary movement. The upper end of the leg 9 may be bent or otherwise formed to provide a downwardly-projecting portion or finger 14, which is adapted to register with the pin 15 on the arm 5. The construction of the leg 9 is such that when its rear end is in contact with the stud 7 of the arm 6 its outwardly-projecting finger 14 will rest in contact with the pin 15 on the arm 5. The points of contact between the leg 9 and the stud 7 and the finger 14 and the pin 15 are formed with great accuracy, so as to provide for fine measurements, as hereinafter set forth.

In Fig. 2 I have illustrated another form of my invention adapted for the measurement of the bottom board of the violin, and while the same construction generally as that described above is employed the calipers differ slightly in detail to provide for a different mode of operation in measuring the bottom board. In this case the arms 16 and 17 are adapted to swing with reference to the frame 4, and said frame is accordingly provided with sockets 18, adapted to receive the projections 19 and 20 of the arms 16 and 17, respectively. These sockets 18 have split ends, and the arms are provided with thumb-screws 21, by means of which arms 16 and 17 may be locked in position when once properly adjusted. The pin 22 in the arm 16 is adjustable, passing up through the threaded opening in the arm 16, so that if in the swinging of the arms to bring them into different positions there should be a slight displacement of said arms, so that the leg 9 would not register properly with the stud 7 and the pin 22, said pin may be moved, so as to take up any discrepancy occasioned by the swinging of said arms.

When my improved calipers are in use for measuring the top board of a violin, by way of illustration, the operation is as follows: The arm 6 is inserted into the *f* hole 3 of the violin and the stud 7 brought up into contact with the inner face of the board. The lower end of leg 9 is then allowed to rest upon the outer surface of the board, whereupon the finger 14 will be lifted from the pin 15 a distance corresponding to the distance between the lower end of the leg 9 and the stud 7. In other words, the finger 14 will be elevated from the pin 15 just the amount of the thickness of the upper board of the violin. This distance between the finger 14 and the pin 15 may be accurately measured by a suitably-tapered bar 24, with a scale thereon, so that the measurement may be made up to within one five-hundredth of an inch, as the case may require. In order to hold the leg 9 in position during the measuring operation or the insertion of the tapering measuring-bar, the operator grasps the leg with his thumb and forefinger in the recess 11 between the lugs 13, so that the movement of the leg is prevented, and accurate measurement may be obtained. Where it is desired to measure the bottom board of a violin, I employ calipers of the form shown in Fig. 2, and in this case the arm 17 is inserted into the $f$ hole of the violin, the arms being swung around at right angles to the frame, as indicated, so as to permit the body of the violin to enter the frame and not interfere with the adjustment of the arms at the proper place within the violin. In the same manner, as above set forth, the stud 7 is brought into contact with the inner face of the bottom board, and the lower end of leg 9 bears against the outer face of the bottom board. This will separate the finger 14 from the pin 22 an equal distance, when the measurement may be taken, as above. In this way the measurement is taken at one side of the violin, and the calipers may then be removed and inserted in the opposite $f$ hole to take the measurement on the other side of the violin, which will require the swinging of the arms 16 and 17 in an opposite direction, and if during the swinging of the arms there should be any displacement of said arms, which would leave the space between the finger 14 and the pin 22 when the lower end of the leg is in contact with the stud 7, this space may be taken up by adjusting the pin 22 to correspond.

While, as above set forth, I have illustrated my invention as applying to the measuring of the thickness of the top and bottom boards of violins, it is apparent that the invention may be applied to many other uses which it is not deemed necessary to illustrate or make specific reference to.

What I claim is—

1. Calipers comprising a frame with projecting arms, a movable leg on one of said arms adapted to register with a point on the other arm, said leg having a downwardly-projecting finger adapted to register with a point on the arm supporting said leg, the distance between said finger and said point giving the thickness of the article measured.

2. Calipers comprising a frame with projecting arms, a movable leg on one of said arms, adapted to register with a projection on the other arm, a projection on the arm carrying said leg, and a downwardly-projecting finger on said leg adapted to register with said last-named projection, the distance between said finger and said projection giving the thickness of the article measured.

3. Calipers comprising a frame with swinging arms, a movable leg on one of said arms adapted to register with a point on the other arm, said leg having a downwardly-projecting finger adapted to register with a point on the arm carrying said leg.

4. Calipers comprising a frame with swinging arms, a movable leg on one of said arms adapted to register with a point on the other arm, an adjustable pin on the arm carrying said leg, and said leg having a downwardly-projecting portion adapted to register with said pin.

In testimony whereof I, the said JEHU FREDERICK HAWORTH, have hereunto set my hand.

JEHU FREDERICK HAWORTH.

Witnesses:
ROBT. D. TOTTEN,
ROBERT C. TOTTEN.